United States Patent [19]

Keith

[11] Patent Number: 4,854,174
[45] Date of Patent: Aug. 8, 1989

[54] COLINEAR FLUCTUATING WALL SHEAR STRESS AND FLUCTUATING PRESSURE TRANSDUCER

[75] Inventor: William L. Keith, Ashaway, R.I.

[73] Assignee: The United States of America as represented by the Secretary of the Navy, Washington, D.C.

[21] Appl. No.: 185,728

[22] Filed: Apr. 25, 1988

[51] Int. Cl.$^4$ .............................................. G01D 21/02
[52] U.S. Cl. ................................ 73/714; 73/DIG. 4; 73/198; 73/204.22; 73/204.26; 73/432.1
[58] Field of Search ................ 73/714, 198, 201, 204, 73/DIG. 4, 432.1, 204.22, 204.26; 310/338

[56] References Cited

U.S. PATENT DOCUMENTS

| | | | |
|---|---|---|---|
| 2,894,317 | 7/1939 | Marks | 310/338 X |
| 2,917,642 | 12/1959 | Wright et al. | 310/338 |
| 3,307,052 | 2/1967 | Neilson et al. | 310/338 |
| 3,337,844 | 8/1967 | Baltakis | 310/338 X |
| 3,383,914 | 5/1968 | MacArthur | 310/338 X |
| 3,501,654 | 3/1970 | Humphries | 310/338 X |
| 3,561,834 | 2/1971 | Alibert et al. | 73/DIG. 4 |
| 3,638,053 | 1/1972 | Schenk et al. | 310/338 |
| 3,732,729 | 5/1973 | Greene | 73/204 X |
| 4,790,187 | 12/1988 | Tsinober et al. | 73/432.1 |

FOREIGN PATENT DOCUMENTS

| | | | |
|---|---|---|---|
| 14515 | 6/1969 | Japan | 310/338 |
| 544877 | 3/1977 | U.S.S.R. | 310/338 |
| 1139985 | 2/1985 | U.S.S.R. | 310/338 |
| 1270593 | 11/1986 | U.S.S.R. | 73/DIG. 4 |

OTHER PUBLICATIONS

*Introduction to Fluid Mechanics;* pp. 338–339; by Robert W. Fox et al.; John Wiley & Sons, Inc. of N.Y. N.Y.; 1973.

Primary Examiner—Tom Noland
Attorney, Agent, or Firm—Arthur A. McGill; Prithvi C. Lall; Michael J. McGowan

[57] ABSTRACT

A unique combination of two transducers. A hot film shear stress gauge and a piezoelectric pressure transducer are coaxially located along the longitudinal centerline of a cylindrical metal shell. The hot film shear stress gauge is exposed to the fluid while the pressure transducer is positioned directly below. Conductors are attached to each and the remaining volume filled with plastic to form a colinear unit. The conductors attached to the hot film element provide power while the conductors attached to the piezoelectric transducer transmit pressure produced electrical signals therefrom. The resulting configuration allows the measurement of fluctuating shear stress and fluctuating pressure to be made simultaneously at a single spatial location at a solid wall bounding a turbulent fluid flow layer.

6 Claims, 2 Drawing Sheets

COLINEAR FLUCTUATING WALL SHEAR STRESS AND FLUCTUATING PRESSURE TRANSDUCER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a multi-parameter fluid flow characteristic sensor and more particularly to a measuring device for determining fluctuating wall pressure and fluctuating wall shear stress simultaneously at a solid wall bounding a turbulent fluid flow.

(2) Description of the Prior Art

In principle, simultaneous measurement of fluctuating wall pressure and fluctuating wall shear stress in a turbulent boundary layer at a single spatial location is attainable in restricted laboratory situations by using a flush mounted piezoelectric pressure transducer and a Laser Doppler Velocimeter (LDV). FIG. 1 shows a typical turbulent boundary layer velocity profile and the viscous sublayer region thereof. In practice, the laser light measuring volume of the LDV must be optically positioned directly above the face of the piezoelectric transducer. The fluctuating streamwise velocity is then measured, and the fluctuating shear stress in the fluid at the wall hereinafter referred to as the fluctuating wall shear stress may then be determined. This measurement may be made provided that the diameter of the measurement volume of the LDV is at least an order of magnitude smaller than the thickness of the viscous sublayer region of the turbulent boundary layer. The viscous sublayer, as shown in FIG. 1, is a very thin region that extends from the wall, in a direction normal to the wall, a distance proportional to the mean wall shear stress. Due to the thinness of the viscous sublayer in water flow laboratory testing facilities however, the above criteria can very rarely be met. In addition, the principle of operation of the LDV necessitates seeding the fluid medium with silicon carbide particles or the like in order to obtain required data rates. Attaining the required density of the seed particles within the viscous sublayer in water is technically very difficult. Measurements of fluctuating wall pressure are frequently made on scale models and full size vessels at Naval testing sites both at sea and in lakes. The use of an LDV is physically impossible for these vessel type tests due to optical constraints, size limitations, and environmental restrictions. An additional disadvantage of the LDV is that it is very costly.

SUMMARY OF THE INVENTION

Accordingly, it is a general purpose and object of the present invention to provide a device for measuring fluctuating wall pressure and fluctuating wall shear stress in turbulent boundary layers in both laboratory and external fluid flow environments. It is a further object that both measurements be made at the same instant in time. Another object is that such measurements be taken at a single spatial location. Still another object is that such device be low in cost.

These objects are accomplished with the present invention by providing a unique combination of two transducers. A hot film shear stress gauge and a piezoelectric pressure transducer are coaxially located along the longitudinal centerline of a cylindrical metal shell. The hot shear stress gauge is exposed to the moving fluid while the pressure transducer is positioned directly below. Conductors are attached to each and the remaining volume filled with plastic to form a colinear unit. The conductors attached to the hot film element provide power thereto while the conductors attached to the piezoelectric transducer transmit pressure produced electrical signals therefrom. The resulting configuration allows the measurement of fluctuating shear stress and fluctuating pressure to be made simultaneously at a single spatial location at a solid wall bounding a turbulent fluid flow.

BRIEF DESCRIPTION OF THE DRAWINGS

A more complete understanding of the invention and many of the attendant advantages thereto will be readily appreciated as the same becomes better understood by reference to the following detail description when considered in conjunction with the accompanying drawings wherein.

DESCRIPTION OF THE PREFERRED EMBODIMENT

Figure 1:
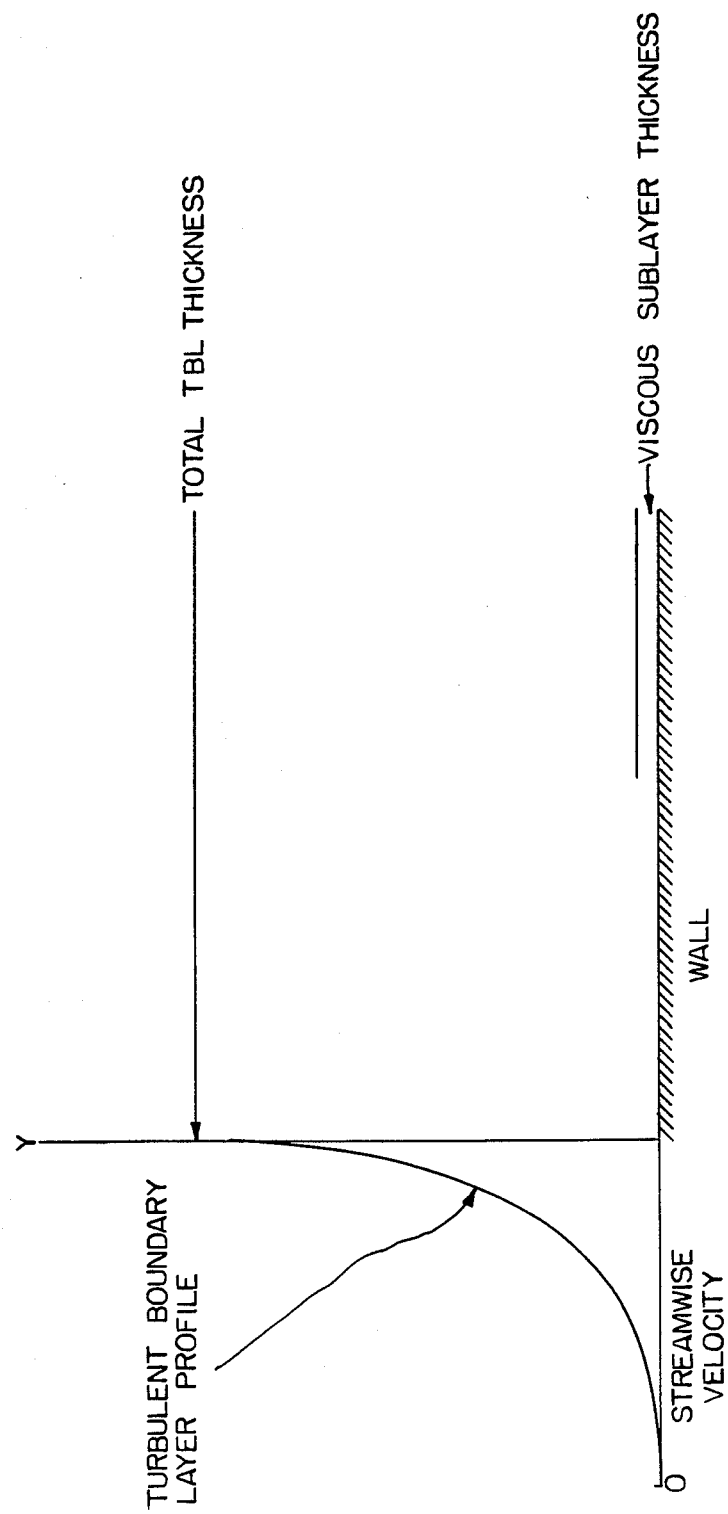
FIG. 1 shows a typical turbulent boundary layer profile for a fluid flowing transversely to a solid wall.
Figure 2:
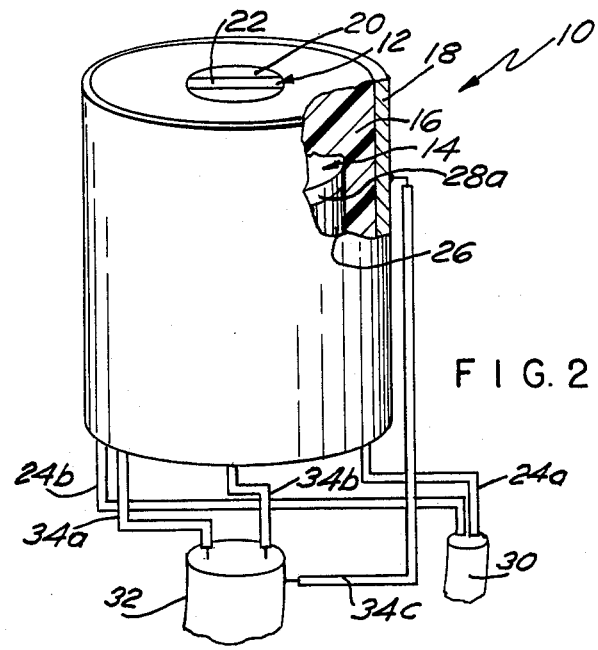
FIG. 2 shows a perspective view of the device of the present invention.
Figure 3:
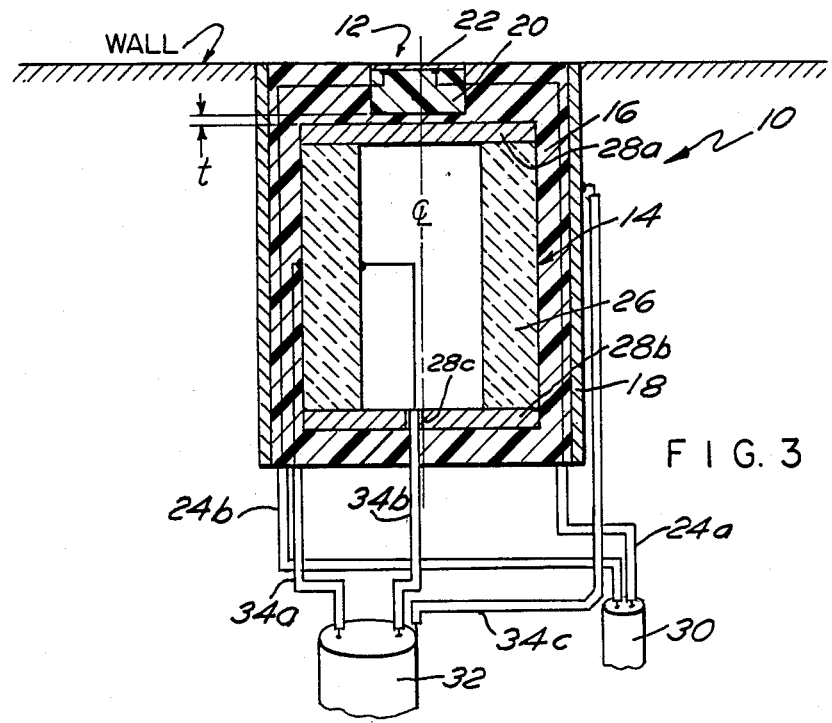
FIG. 3 shows a cross-sectional view of the device of FIG. 2.

Measurement of the fluctuating wall shear stress and fluctuating wall pressure may be made simultaneously at a single spatial location using the present invention. By simultaneously is meant over a single preselected period of time. Referring now to FIGS. 2 and 3 there is shown a perspective view and a cross sectional view respectively of a colinear fluctuating wall shear stress and fluctuating pressure measuring device 10. Device 10 further comprises a hot film shear stress gauge means 12 and a piezoelectric transducer means 14, coaxially positioned relative to each other generally as shown in FIG. 2. A plastic potting compound 16, which is a Urelite 3140 material or the like, fills the interstitial volume surrounding gauge means 12, transducer means 14, and an outer cylindrical metal shell 18. Gauge means 12 further comprises an epoxy substrate 20 into which a platinum hot film resistive element 22 is flush mounted, element 22 being connected to power conducting leads 24a and 24b. Leads 24a and 24b have insulation covering the lead length external to potting compound 16. Piezoelectric transducer means 14 is a cylindrical device further comprising an air filled hollow cylindrical piezoelectric ceramic shell 26, each end of which is fixedly attached to aluminum disc end caps 28a and 28b. Each end cap is of a diameter corresponding to that of shell 26, cap 28b further having an aperture 28c passing therethrough. Power is transmitted to, and electric signals transmitted from, gauge 22 and transducer means 14 respectively by cables 30 and 32 respectively. The uninsulated lengths of conductive leads 24a and 24b of cable 30 pass through potting compound 16 and epoxy 20, and conductively attach to element 22. The uninsulated length of lead 34a of cable 32 passes through potting compound 16 and conductively attaches to the exterior surface of shell 26 at a preselected location thereon. The insulation covered length of lead 34b extends through potting compound 16 and through aperture 28c of disc 28b into the air filled volume of transducer 14. The uninsulated length of lead 34b then conductively attaches to the interior surface of shell 26 diametrically opposite lead 34a. Insulated lead 34c, being a continuation of the outer ground shield of cable 32, conductively attaches to metal shell 18.

FIG. 3 shows device 10 typically mounted such that platinum element 22 of gauge means 12, potting material 16 and the top end of metal shell 18 are flush with the surrounding solid wall and are thus in contact with fluid flowing therealong. The presence of piezoelectric transducer means 14 does not affect the performance of element 22 nor does the presence of gauge means 12 interfere with the performance of piezoelectric transducer means 14. It is noted that the longitudinal centerline of device 10 corresponds to the centerlines of gauge means 12, transducer means 14 and metal shell 18 thereby forming a colinear device.

The impinging pressure signal is transmitted to the piezoelectric transducer means 14 through gauge means 12 as well as the Urelite 3140 material surrounding it. The thickness, 't', of potting material 16 shown between gauge means 12 and transducer means 14 may be varied as desired or omitted entirely (i.e., t=0) leaving the epoxy substrate of gauge means 12 in direct contact with transducer means 14.

The mode of operation of gauge means 12 and transducer 14 are as follows. The electrical resistance of platinum film element 22 is highly temperature dependent. The operating temperature of the film depends on the magnitude of the current passing through it and the heat flux from the film to the surrounding environment. In general, a heat flux exists from the film to the fluid and also to the epoxy substrate upon which the film is mounted. By variably controlling the current passing through film element 22, the resistance of the film element is kept constant, and a constant temperature mode of operation is thus achieved. Fluctuations in the velocity field within the thermal boundary layer of the sensor lead to fluctuations in heat flux from the film element to the fluid, which are then compensated for by varying the current passing through the film element. A feedback control system, such as a Temperature Sensors Inc. Model No. TSI IFA100 Intelligent Flow Analyzer, is used to compensate such current shifts. Square wave tests have shown that a high frequency cut-off of 30 kHz is attainable for this system. Hot film gauge means 12 are commercially available, while the particular piezoelectric pressure transducers used is normally designed and fabricated for the intended application.

An advantage of this device is that it allows a new class of fluctuating fluid characteristic measurements to be made in a turbulent fluid flow field, both in the laboratory and in a variety of external environments. Such measurements are of fundamental importance in understanding the physics of turbulent flow. The object of making such measurements is to permit determination of the relationship between the physical quantities of fluctuating pressure and fluctuating shear stress which exist at a solid wall bounded by turbulent fluid flow. Such measurements, although possible in principle in very limited circumstances using the prior art method described above, do not appear to have been made to date. n addition, the cost involved in using device 10 is one to two orders of magnitude less than using the prior art LDV method previously described.

The measurements made with device 10 permit determination of the relationship between fluctuating wall shear stress and fluctuating pressure at a solid boundary. Such knowledge then allows the magnitude of turbulent boundary layer pressure fluctuations to be deduced using hot film shear stress gauge means 12 alone. Such use is extremely important as gauge means 12 is not subject to acoustic contamination from sources other than the turbulent boundary layer. By using only gauge means 12, turbulent boundary layer pressure fluctuations may then be measured, not only in experimental lab flow facilities, but on full scale Naval vessels in order to distinguish turbulent boundary layer produced noise from other noise sources. The knowledge gained from such at sea measurements will directly enhance current Naval efforts in the reduction of flow noise, a limiting performance factor on mobile acoustic sensors.

What has thus been described is a unique combination of two transducers. A hot film shear stress gauge and a piezoelectric pressure transducer are coaxially located within a cylindrical metal shell. The hot shear stress gauge is exposed to the moving fluid while the pressure transducer is positioned directly below. Conductors are attached to each and the remaining volume filled with plastic to form a colinear unit. The conductors attached to the hot film element provide power while the conductors attached to the piezoelectric transducer transmit pressure produced electrical signals therefrom. The resulting configuration allows the measurement of fluctuating shear stress and fluctuating pressure to be made simultaneously at a single spatial location at a solid wall bounding a turbulent fluid flow.

Obviously many modifications and variations of the present invention may become apparent in light of the above teachings. For example: the possibility exists of mounting platinum conducting element 22 from the hot film gauge directly on end cap 28a, such that the piezoelectric material would directly support the element. Also, the potting material may be varied provided the pressure transmission characteristics are such as to permit the piezoelectric transducer to receive pressure signals in essentially unmodified form. In addition, gauge means 12 may be in contact with transducer 14, i.e. t=0 or, spaced a preselected distance away. While such a design would decrease the overall size of the device the increased complexity in fabrication would be significant.

In light of the above, it is therefore understood that within the scope of the appended claims, the invention may be practiced otherwise than as specifically described.

What is claimed is:

1. An apparatus for simultaneous measurement of fluctuating wall shear stress and fluctuating pressure in a turbulent boundary layer fluid flow field, comprising:

shear stress gauge means, having a cylindrical shape and a first longitudinal axis, for measuring shear stress in the fluid being monitored;

piezoelectric transducer means, having a cylindrical shape and a second longitudinal axis, positioned physically below said shear stress sensing means, said second axis being colinear with said fist axis, for converting fluctuating pressure signals to corresponding electrical signals;

a first cable, having first and second insulated leads conductively connected to said shear stress sensing means, for providing power thereto;

a second cable, having third, fourth and fifth insulated leads, said third and fourth leads being conductively connected to said piezoelectric transducer means, for receiving and transmitting the electrical signal output thereof;

a cylindrical metal shell, having a first end, a second end and a third longitudinal axis, said shell enclosing said shear stress gauge means, said transducer means and said first and second cable leads, said third longitudinal axis being colinear with said first and second axes, said cylindrical metal shell further being conductively connected to said fifth lead of said second cable, for providing a grounded protective shield thereabout; and potting compound, filling all remaining volume within said shell, for maintaining relative component spacing;

said first shell end, said potting compound and said shear stress gauge means forming a coplanar surface for flush mounting with respect to a containment wall for the fluid being monitored.

2. An apparatus according to claim 1 wherein said shear stress sensing means further comprises:

a hot film stress gauge; and a cylindrical epoxy substrate, encapsulating said stress gauge such that it is flush with the surface of one end threof, for reducing heat transfer away from said shear stress sensing means through surfaces in mutual contact therewith.

3. An apparatus according to claim 2 wherein said piezoelectric transducer means further comprises:

a hollow cylindrical piezoelectric ceramic shell, having a fourth longitudinal axis, third and fourth ends and preselected inner and outer diameter surfaces, said third and fourth leads of said second cable being conductively connected to said inner and outer diameter surfaces thereof, for providing said pressure produced electrical signal;

a first metal disc, having a diameter matching that of said cylindrical ceramic shell, said disc being fixedly attached to said third end of said cylindrical shell; and a second metal disc, having a diameter matching that of said cylindrical ceramic shell and an aperture therethrough for passing said fourth lead, said second metal disc being fixedly attached to said fourth end of said cylindrical shell.

4. An apparatus according to claim 3 wherein said first and second metal discs are aluminum.

5. An apparatus according to claim 4 wherein said cylindrical metal shell is corrosion resisting steel.

6. An apparatus according to claim 5 wherein said potting compound is Urelite 3140 plastic.

* * * * *